US008105164B2

(12) United States Patent
James-Herbert

(10) Patent No.: US 8,105,164 B2
(45) Date of Patent: Jan. 31, 2012

(54) COMPUTER GAME CONTROLLERS

(75) Inventor: Robert James-Herbert, Ruse (AU)

(73) Assignee: Robert James-Herbert, Campbelltown (AU)

(*) Notice: Subject to any disclaimer, the term of this patent is extended or adjusted under 35 U.S.C. 154(b) by 1067 days.

(21) Appl. No.: 11/930,534

(22) Filed: Oct. 31, 2007

(65) Prior Publication Data
US 2008/0153592 A1 Jun. 26, 2008

Related U.S. Application Data

(63) Continuation-in-part of application No. 10/518,366, filed on Jul. 20, 2005, now Pat. No. 7,347,779, and a continuation-in-part of application No. PCT/AU2006/000616, filed on May 11, 2006, said application No. 10/518,366 filed as application No. PCT/AU03/00765 on Jun. 17, 2003.

(30) Foreign Application Priority Data

May 12, 2005 (AU) ................. 2005902416

(51) Int. Cl.
*A63F 9/24* (2006.01)
(52) U.S. Cl. ........................................ 463/36
(58) Field of Classification Search ............... 463/30–36
See application file for complete search history.

(56) References Cited

U.S. PATENT DOCUMENTS

| 4,630,817 | A | | 12/1986 | Buckley |
| 5,195,746 | A | | 3/1993 | Boyd et al. |
| 5,252,068 | A | | 10/1993 | Gryder |
| 5,364,271 | A | * | 11/1994 | Aknin et al. ............... 434/61 |
| 5,431,569 | A | | 7/1995 | Simpkins et al. |
| 5,437,453 | A | | 8/1995 | Hineman |
| 5,860,861 | A | | 1/1999 | Lipps et al. |
| 5,890,995 | A | | 4/1999 | Bobick et al. |
| 5,908,300 | A | | 6/1999 | Walker et al. |
| 5,947,824 | A | | 9/1999 | Minami et al. |
| 6,030,223 | A | | 2/2000 | Sugimori |
| 6,132,314 | A | * | 10/2000 | Aiki ............................ 463/37 |
| 6,364,771 | B1 | * | 4/2002 | Lee ............................. 463/46 |
| 6,471,586 | B1 | * | 10/2002 | Aiki et al. ................... 463/6 |
| 6,575,836 | B1 | * | 6/2003 | Nishimura ................. 463/46 |
| 2003/0171190 | A1 | * | 9/2003 | Rice ........................... 482/57 |
| 2004/0219978 | A1 | * | 11/2004 | Teramoto et al. .......... 463/32 |
| 2005/0096131 | A1 | * | 5/2005 | Ouchi ........................ 463/31 |

FOREIGN PATENT DOCUMENTS

DE 4445861 A1 6/1996
WO 04000430 A1 12/2003

* cited by examiner

*Primary Examiner* — Masud Ahmed
(74) *Attorney, Agent, or Firm* — Hogan Lovells US LLP

(57) ABSTRACT

A controller means for playing a compuler game where the player may brace themselves using handlebars, other means which may be grasped, and/or pedals and move a support means on which the player may sit, stand, or be supported, on a bearing means to input control signals to a control means. Movement of the game player provides the normal forwards and backwards and side to side control functions of the controller to control a sprite in the computer game being played. Resistance to movement provides physiotherapy-type exercise for the player. Where particular muscle groups or limbs of patient may need to be exercised, the controller means may be set up to provide that exercise as part of a computer game.

19 Claims, 14 Drawing Sheets

COMPUTER GAME CONTROLLERS

CROSS-REFERENCE TO RELATED APPLICATIONS

The present application claims priority from Australian Provisional Patent 2005902416 filed on 12 May 2005, the content of which is incorporated herein by reference and is a continuation-in-part of U.S. patent application Ser. No. 10/518,366, the content of which is incorporated herein by reference.

FIELD OF THE INVENTION

This invention relates to improvements in the field of computer game controllers.

BACKGROUND OF THE INVENTION

With its growth in popularity across a wide age group, home computer gaming is now a major domestic pastime. A typical home computer game console system will include a computer containing the main central processing unit or CPU, a visual display unit (VDU) on which the game being played is displayed and some form of interactive unit or game control means such as a keyboard, joy stick, or joy pad enabling a player or players to react to and influence events during the course of game. Home computer games are sometimes played on a home computer such as a PC in which case either the keyboard or a separate game controller such as a joy stick is used as the game controller, but more commonly, the CPU forms part of a dedicated computer game console using a domestic television as the VDU.

Over the years, computer gaming systems have increased markedly in speed, sophistication and graphics capabilities. Game controllers have also improved. When playing a driving game for example, it is possible to control a vehicle appearing in the driving game using a customised steering wheel and pedals rather than a joy pad, joystick or the like, although such controllers are generally not supplied with computer gaming systems and have to be purchased separately. It is also possible to purchase highly sophisticated joysticks and other hand operated game controllers in the after market.

However, despite the many improvements in game controllers, playing any driving, riding or flying game on a computer essentially remains a sedentary function. Whilst the player is able use both their hands and feet when they are playing a driving game, when playing other games, players generally only use their hands with the result that whilst playing a computer game may be involved and mentally stimulating, it does not result in a great deal of physical involvement for the player.

Children in particular, are keen players of computer games from an early age, although computer games tend to be more popular with older children and teenagers. The amount of time some children and teenagers spend playing computer games is recognised as being a problem by many parents who may feel that the time their children spend playing computer games is wasted and that they should be playing sport or physical games getting more physical exercise and achieving health benefits from doing so. There is also a growing recognition of an increasing tendency for children, even very young children, to be overweight and even obese. Obesity in children is known to be a major factor in childhood diabetes. Whilst childrens' diets particularly the consumption of junk foods is a major cause of obesity, lack of exercise is a significant contributing factor. However while parents recognise that children should be getting more exercise for the good of their health, they also recognise that it is generally safer for their children to be at home playing computer games than outside playing in a public area such as a park or the like.

International patent application No PCT/AU2003/000754, the entire contents of which are incorporated by reference, discloses an improved computer game controller which combats obesity by suspending a player in a chair, harness or the like from a bearing/control means in an arrangement in which the player may move the chair or harness to control functions on the computer game. Thus, the player has to physically move in order to control action in a computer game and, in doing so, is exercising their body. Further, PCT/AU2003/00754 discloses the use of elastic straps for increasing the resistance to movement and turning of the harness or chair, thereby providing increased resistance to movement of the player and increasing the exercise value of playing a computer game on the controller.

Although the improved computer game controller of PCT/AU2003/000754 is a significant improvement over existing computer game controllers, it is relatively bulky and is not necessarily suitable for use by younger children.

In one aspect, the present invention aims to provide an improved computer game controller and one which is particularly suited to smaller children, but may also be used by adults.

In other aspects, the present invention aims to provide an apparatus which has improved exercise value and which may have applications in physiotherapy and related fields beyond what is disclosed in PCT/AU2003/00754.

In yet further aspects, the present invention aims to provide further improvements to what is shown in PCT/AU2003/000754.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

In one first broad aspect, the present invention provides one or more controller means for controlling a computer game, the controller means defining:
  a support means, seat or the like on which a player may sit, stand or be supported;
  the support means being disposed on a bearing means incorporating or associated with a control means; and
  handlebars or similar means which may be grasped by the player and/or foot pedals or the like against which the player may brace their feet, in use;
  wherein the arrangement is such that in use, the player may brace themselves using the handlebars and/or pedals and move the support means on the bearing means to input control signals to the control means.

In use, the controller means may be substituted for the standard joystick, joypad or other control means of a computer game console such as an "X-Box", "PLAYSTATION" or the like. Inputs to the control means caused by movement of the seat are input into the computer game console to control the movement of a sprite or multiple independent such as vehicles or characters in a computer game. Thus movement of the chair or support means controls the sprite or sprites in the computer game.

The control means may operate in a similar manner to a joystick in which movement of the game player provides the normal forwards and backwards and side to side control functions of the joystick. These control means may affect the sprite's forward, backward, upwards or downwards or other movement.

The support means may include, or have mounted upon it, a chair, saddle, cradle or the like. Alternatively, it may simply provide a plate, preferably defining rubber pads, or coated with an elastomer or other non-slip coating or material, which may optionally be padded also, on which a player may mount or fix their own surfboard, skateboard or the like to play a game.

In particular, the support and control means may rotate, tilt sideways, backwards and forwards. It may also slide backwards and forwards and side to side and be able to be lifted and dropped a few centimetres for gravity effects. The latter effects may be "assisted" by the controller means, particularly where the controller means is part of an arcade game where, it is common to make game easier to play than for home gaming to avoid discouraging customers. The assistance may be provided by any suitable means including hydraulically or pneumatically, but is most preferably provided electronically by controlled servo-motors. The provision of assistance reduces, but does not eliminate, the physical effort required to use the controller.

Assisted control may also be provided on game controllers where the player is suspended from a support means associated with a control means such as is described in PCT/AU2003/000754.

The support means whether disposed below, or above the player as in PCT/AU2003/000754, is preferably associated with additional control means which may be operated by the player's hands, feet, legs, fingers or arms. These additional control means may include fixed handle bars, rotating wheels, finger and/or wrist controlled mechanisms, such as buttons handles and levers. The additional control means may also include foot pedals which may be depressed or rotated (as is the case with bicycle pedals), paddles which slide back and forward and push/pull foot braces, requiring a pumping action from the legs, or a treadmill to simulate walking. Some or all of the additional control means are also preferably associated with resistance means to exercise the players hands, feet, legs or arms. The resistance means may be provided by and suitable means including, but not limited to, hydraulic or pneumatic cylinders, electronically, using servo-motors or other means, or using elastic or elastomeric means, springs, braking systems etc.

Thus in a related, second, broad aspect the present invention provides one or more controller means for a computer gaming machine including a support platform, such as a seat, platform, chair harness or the like, on which a player may sit, stand, lie, be suspended via a bearing means incorporating a control means, and wherein additional control means are provided for operation by one or more of the player's limbs including legs, feet, arms, hands, or fingers, and wherein resistance to movement of one or more of the additional control means is provided, thereby providing physiotherapy type exercise for the player.

More specifically, the present invention provides a computer game controller comprising means for suspending a player, in a support means such as a chair, or harness, from a bearing means, the bearing means including a control means for inputting position signals to a computer to control the movement of a sprite such as a vehicle or character, in a computer game, the bearing allowing side to side, forwards and backwards, and rotational movement of the player about the bearing and including selectively operable locking means for preventing either rotational movement or side to side and forwards and backwards movement, the arrangement being such that movement of the player's body may move the chair or harness to control the sprite in the computer game, the controller, further including resistance means for increasing the resistance to movement of the support means relative to the bearing, thereby providing physiotherapy exercise for the player.

In this way the game controllers of the present invention may be used in physiotherapy applications. Where particular muscle groups or limbs of patient may need to be exercised, the controller means may be set up to provide that exercise as part of a computer game. Physiotherapy typically involves repetitive movement of particular limbs, muscle groups etc., which can be extremely tedious for the patient. Incorporating the exercise required into a computer game where repetitive movements are required for playing a game reduces patient boredom by immersing the patient in a whole of body gaming experience. Playing standard computer games using standard controllers such as joy pads or steering wheels involves a player making repetitive movements but because they are involved in playing a game, the repetition of these movements is not "boring". In the present invention the player's/patient's immersion in the game is increased by involving whole body control, reducing the likelihood of boredom still further.

Although many different set-ups are possible for the game controllers of the present invention for physiotherapy functions, examples where the player is suspended include games where a pushbike, or at least a frame configured to simulate a pushbike, is suspended from the support means/controller and resistance is provided to turning of the pedals to determine a player's speed in a game, with a patient's leaning or rotation controlling direction. For patients without use of their legs, possible applications may include suspending them from the support means/controller either in a wheel chair or on a seat, and allowing them to brace with their hands/arms and twist their body to control a computer game. A similar arrangement could of course be provided with the support means/controller below the patient although, resistance to turning movement would be expected to be much greater in that arrangement. Resistance for physiotherapy reasons can be provided to extension of a patient's legs as the basis for a rowing simulation, or for skiing or walking.

It will also be appreciated that whatever physiotherapy is provided, it is not necessary for the game/simulation being provided to correspond to the exercise. Although it is possible for the machine to be set up to provide a simulation of the exercise e.g. cycling or rowing being carried out, it is equally possible to exercise while piloting a simulation of a space ship or controlling a sprite. The person skilled in the art will appreciate that any controller means of the present invention may be used to provide a wide range of different exercise and physiotherapy applications.

Thus as well as providing exercise in a generic sense, it is also possible for the game controllers to be configured to provide exercise for a specific function such as limb rehabilitation.

For the below player embodiment, the controller means will typically be mounted on a base frame, which preferably may be dismantled for ease of storage when not in use. The support means and bearing means may be located in the centre of the frame mounted on top of bracing elements/crossbeams or the like.

In other aspects, as discussed above, the support means may be a platform on which a player may stand, or it may comprise a harness.

BRIEF DESCRIPTION OF THE DRAWINGS

A specific embodiment of the present invention will now be described by way of example only and with reference to the drawings in which:—

DETAILED DESCRIPTION OF A PREFERRED EMBODIMENT

Figure 1:
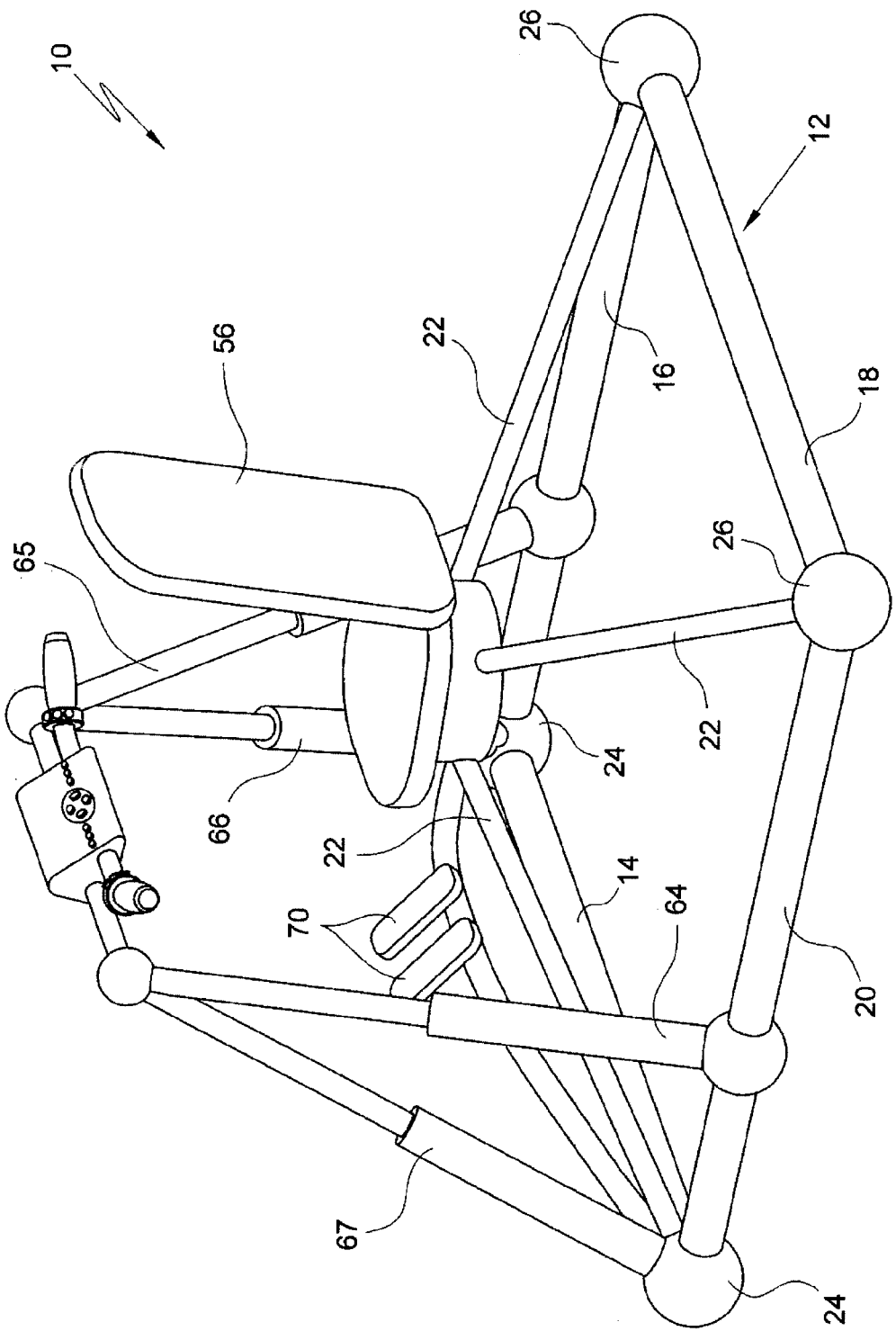
FIG. 1 is a perspective view of a computer game controller embodying the present invention.
Figure 2:
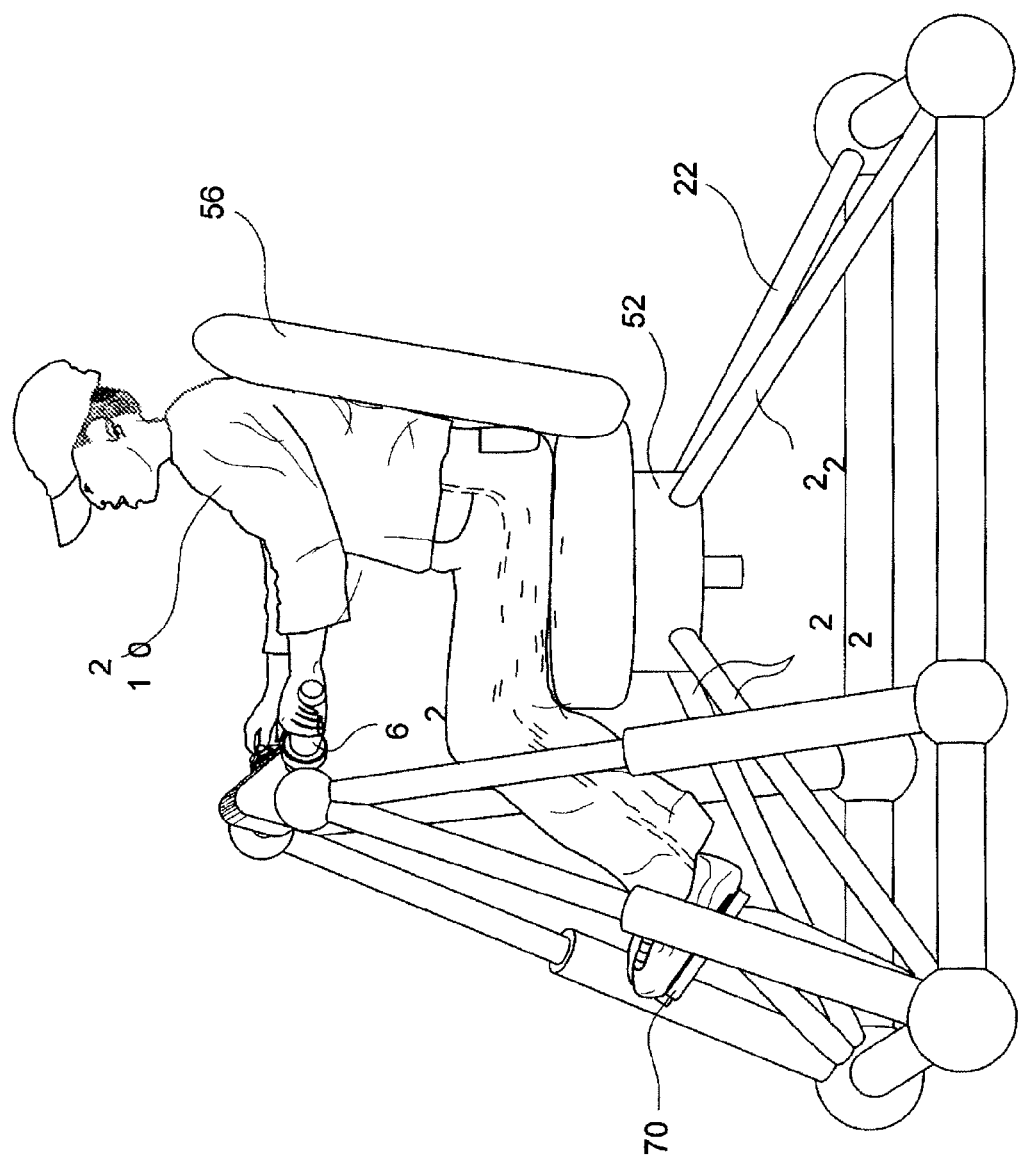
FIG. 2 is a side view of the controller of FIG. 1, in use.
Figure 3:
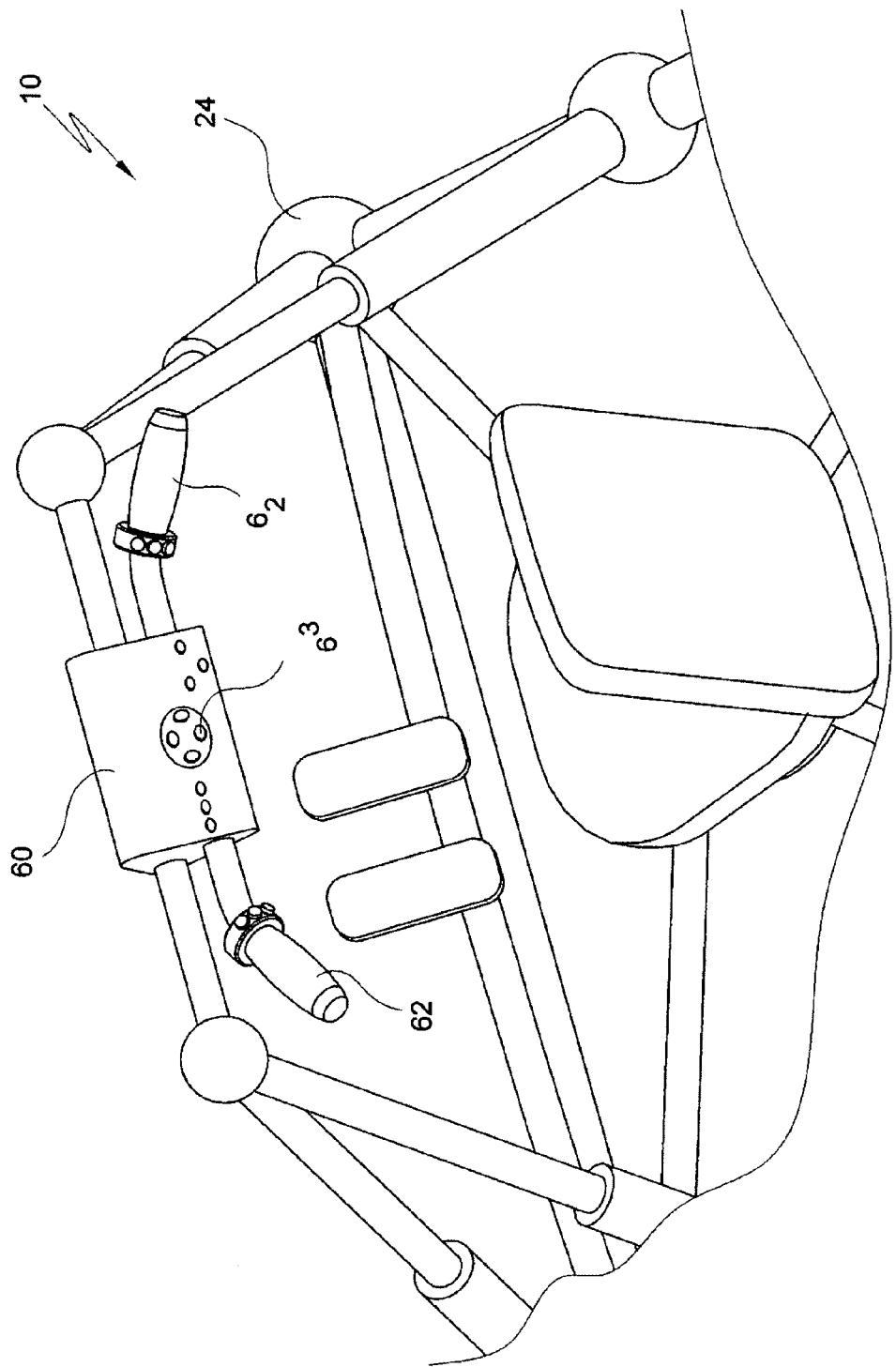
FIG. 3 is a view of the controller of FIG. 1 showing the handlebars and control panel, in particular.

Referring to the drawings, FIGS. 1 to 3 show a computer game controller 10 which includes an external frame 12 which is typically square having a side length of approximately 1.2 m. The frame 12 is made up of four rods or bars 14, 16, 18, 20 having a length of 1.2 m which are typically joined by hinges 24 at two corners and removable clamps 26 at the other two corners so that the frame 12 can be easily disassembled and folded up for storage, although other arrangements of folding frames are possible. Cross beams, 22 which extend upwards from the corners of the frame to a point above a point at or near the centre of the frame, are provided to brace the frame, provide support for a bearing and control means 52 and provide additional rigidity to the frame.

Figure 4:
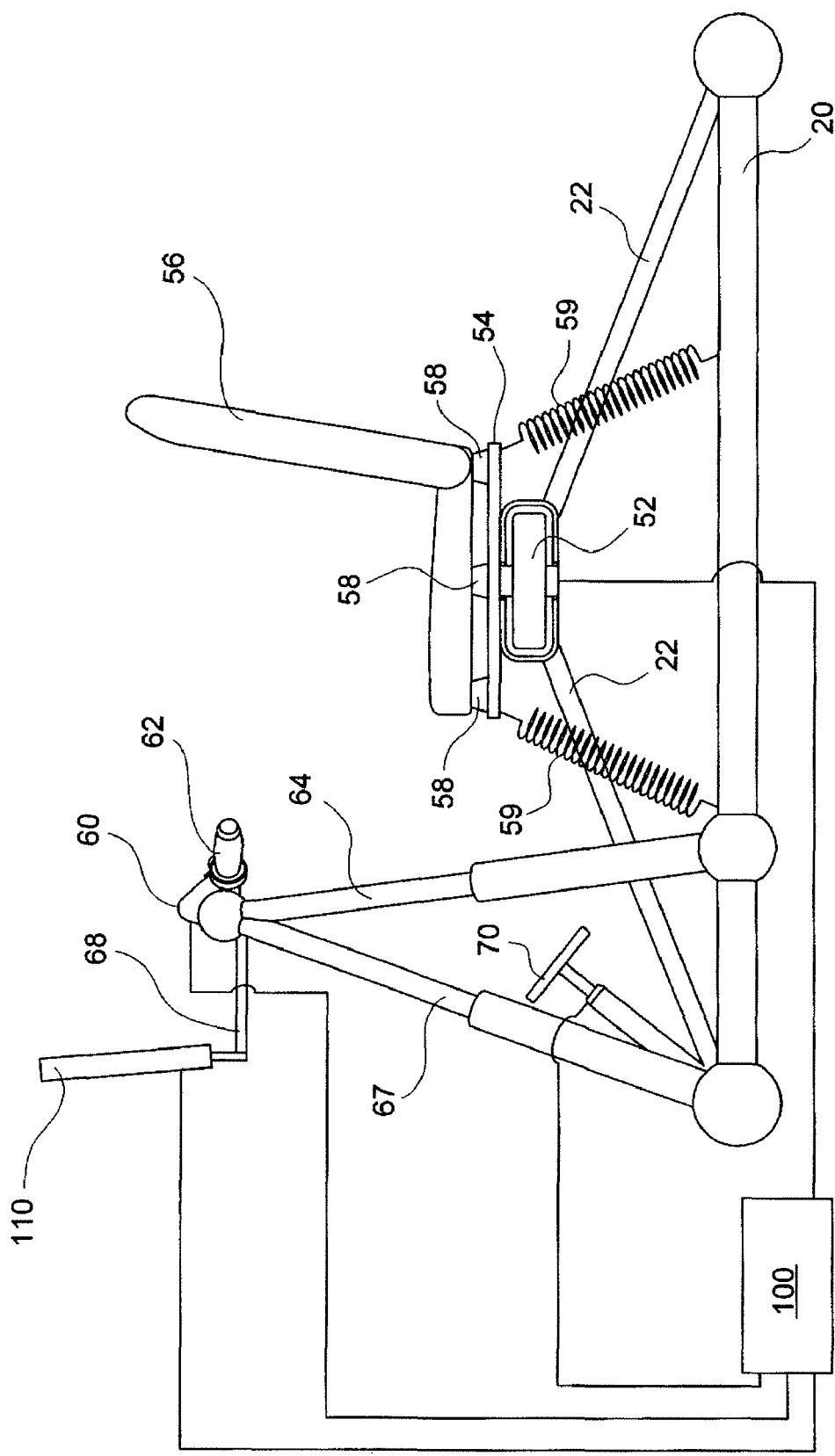
FIG. 4 is a schematic view of a computer game controller embodying the present invention including a screen and gaming system.

As discussed above the bearing and (joystick type) control means 52 is mounted in the centre of the frame and its structure is described in more detail below. With reference to FIG. 4, mounted on top of the bearing and control means 52 is a plate 54 for supporting a seat/chair 56. The plate/bearing 54 can be tilted backwards and forwards or side to side and may rotate about a vertical axis. Locking means, not shown in FIG. 4, may be provided to limit movement to tilting movement or rotational movement only. Control signals from movement of the bearing/plate are input to the controller system 50. Signals from the controller are input to a game console/controller 100, (refer to FIG. 4) which is shown as a separate controller such as an "X-Box"®, "PLAYSTATION"® or the like or which could be a dedicated controller or even incorporated into the game controller itself. Such game controllers are well known in the art and will not be described here in detail. Game software is typically downloaded into the game console via a cartridge or CD or DVD type disc.

The seat 56 is mounted on the support plate 54 on four rubber feet 58 of which only three are visible in FIG. 4. Thus, movement of the seat/seat plate causes control signals to be input to the controller 52 which can in turn be used to control the sprite, vehicle or the like in the computer game being played on the console 100.

The game controller includes a control panel 60 and handle bars 62 which may include additional input means such as buttons 63, levers (not shown), twist grips (particularly for the handle bars) and the like for supplying additional inputs to the control system. The control panel is supported at a suitable height from the base by four telescopically adjustable supporting struts 64, 65 66, and 67. Also provided are adjustable pedals 70 which are mounted from the front of the chair frame. The height, position and configuration of the control panel, handle bars, and pedals may be adjusted to suit the player and/or game being played. For example the controls for a game where the player rides a motorcycle may be arranged to that the speed of the motorcycle is controlled by twisting one handlebar whereas in a different game which involves, say driving a car, speed control may be via depression of one of the pedals 70. The various controls are connected to the game console 100.

A separate screen 110 may be mounted on the frame for displaying the game, via a strut 68, however that is a relatively expensive option, and more typically a separate display screen such as a TV screen will be simply placed in front of the controller to display the game. Arcade versions of the machine will, however, typically have integral plasma screens.

Figure 5:
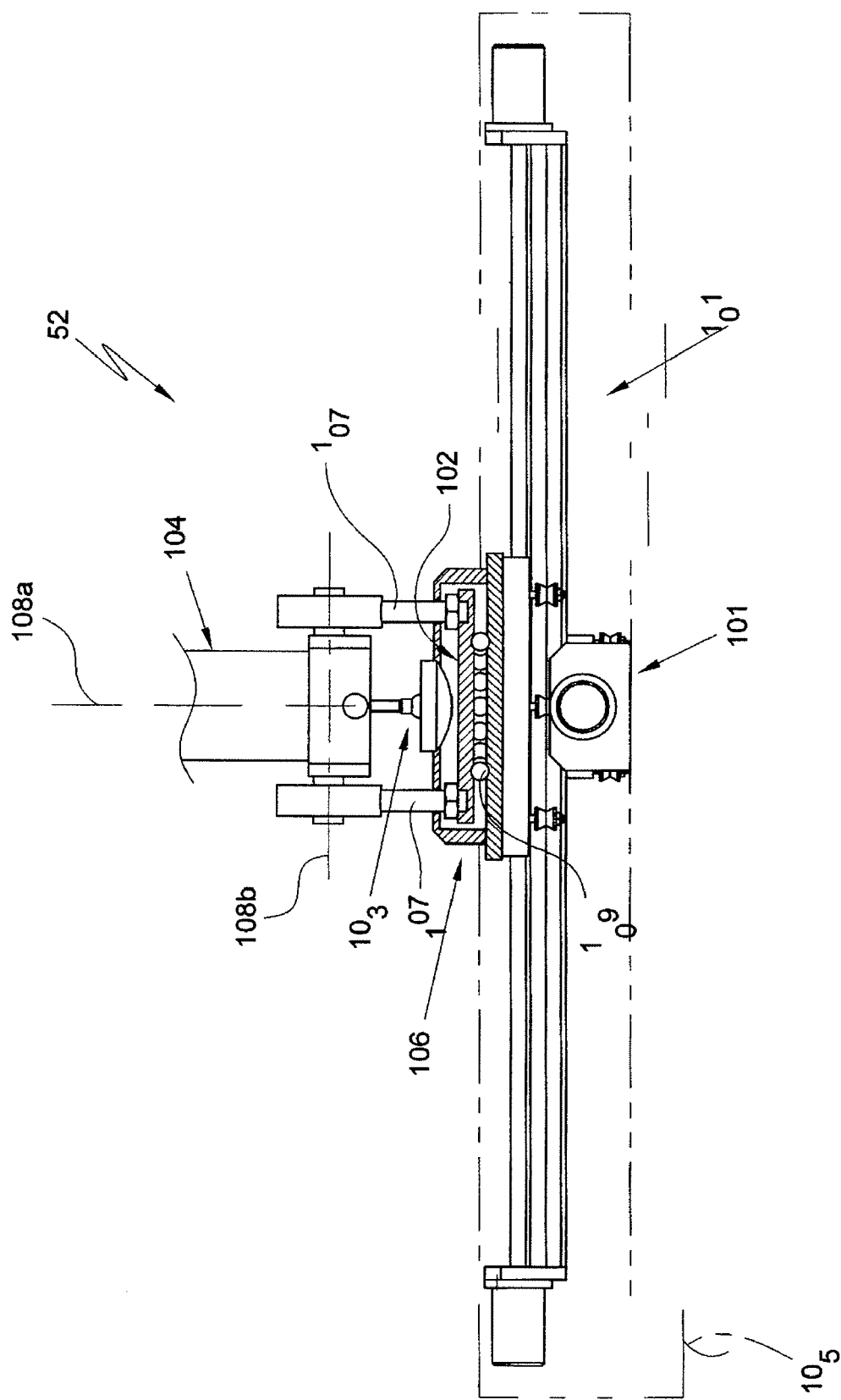
FIG. 5 is a side view of a control/bearing of the controller of FIGS. 1 to 4.
Figure 6:
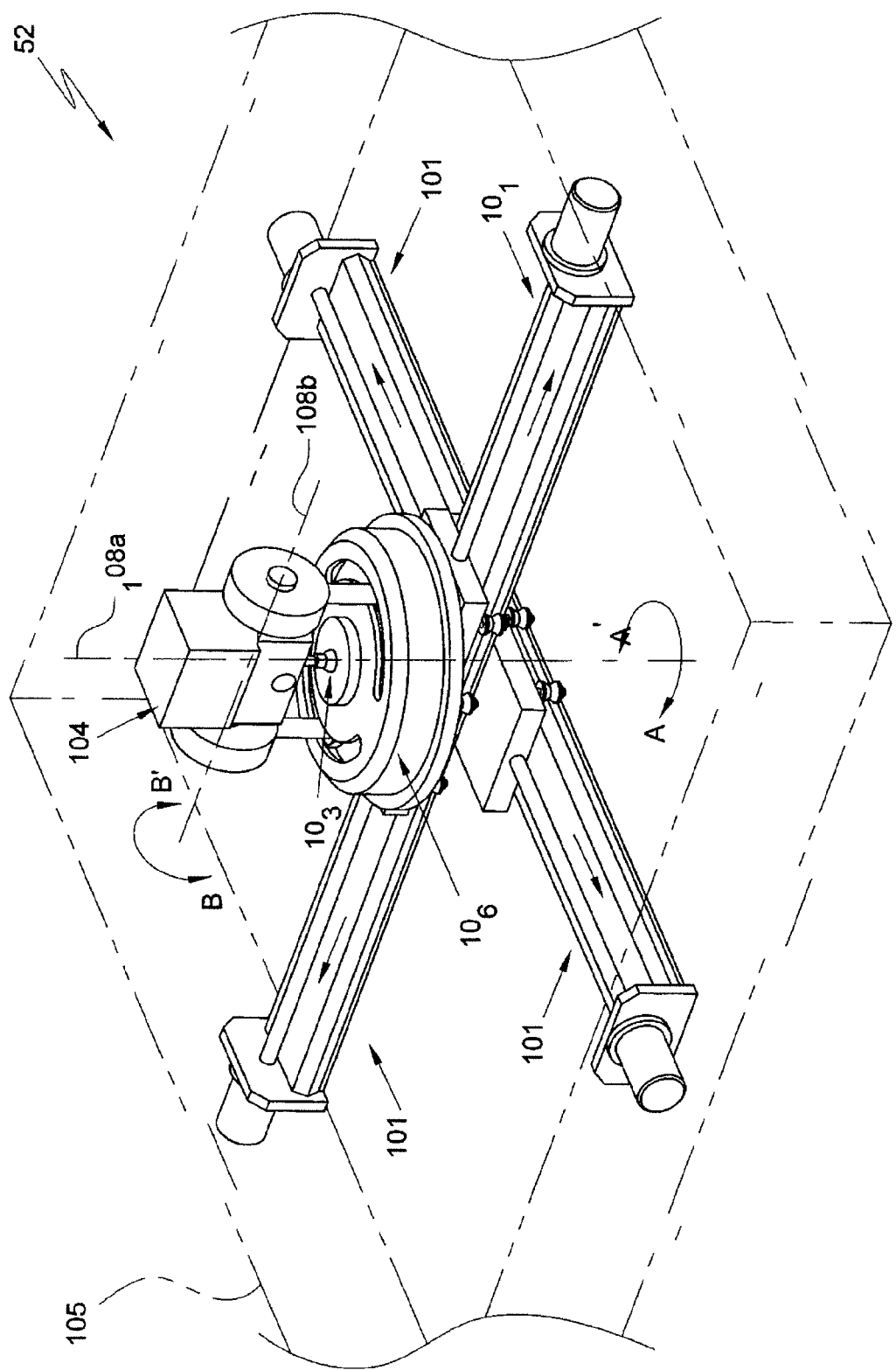
FIG. 6 is a perspective view of the control/bearing of FIG. 5.

FIGS. 5 and 6 show the support bearing and control means 52 in more detail. The control means is mounted on a servo-assisted control means mounted in a housing 105 defining two cross beams 101 for translating a control unit 106 mounted on top of the servo-assisted control means in perpendicular directions, thus providing assisted side to side and back and forth movement. Also provided, but not illustrated, is a lift and drop mechanism which can raise the bearing 52 by 3 cm before allowing the bearing 52 to drop. At the centre of the control unit 106 is a joystick control means 103 (providing pan and tilt movements). A support means 104 is supported above the control means 103 by two struts 107 whose lower ends rotate in a bearing 102 including a tracked ball bearing race 109 to provide rotational movement about a vertical axis in directions of arrows A-A'. Tilting movement in direction B and B' is provided by rotation of the support means about and axis 108b passing through the upper ends of the struts. Locking means, not shown are provided to lock the control means in position for either back and forwards or side to side movement, or rotation. It will be appreciated that the servo-assisted control means are optional and would normally only be provided on arcade version of the game controller although the option exists to provide them for home use game controllers or for physiotherapy applications, if desired. For home use, the control unit 106 alone is provided.

In use, as shown in FIG. 2, the controller 10 is configured to suit the game being played and the player 120 sits on the seat 56 and controls movements of the sprite/vehicle or the like in the computer game being played by bracing against the pedals and/or handle bars and moving the seat forwards and backwards and side to side and/or rotating the seat about a vertical axis. Biasing means may be provided for increasing the resistance to movement of the seat thereby increasing the effort required to operate the controller. The biasing means may be provided by hydraulic or pneumatic cylinders, electronically, using servo-motors or other means, or using elastic or elastomeric means, springs, braking systems or any other suitable means. Springs 59 are shown in FIG. 4 as one exemplary biasing means.

By providing a floor based exercise system, the assembly, dismantling and storage of the controller 10 becomes easier than a suspension based system. It would however be best suited to lighter players particularly smaller children rather than adults as the control system will decrease in effectiveness as the player's weight increases.

Figure 7:
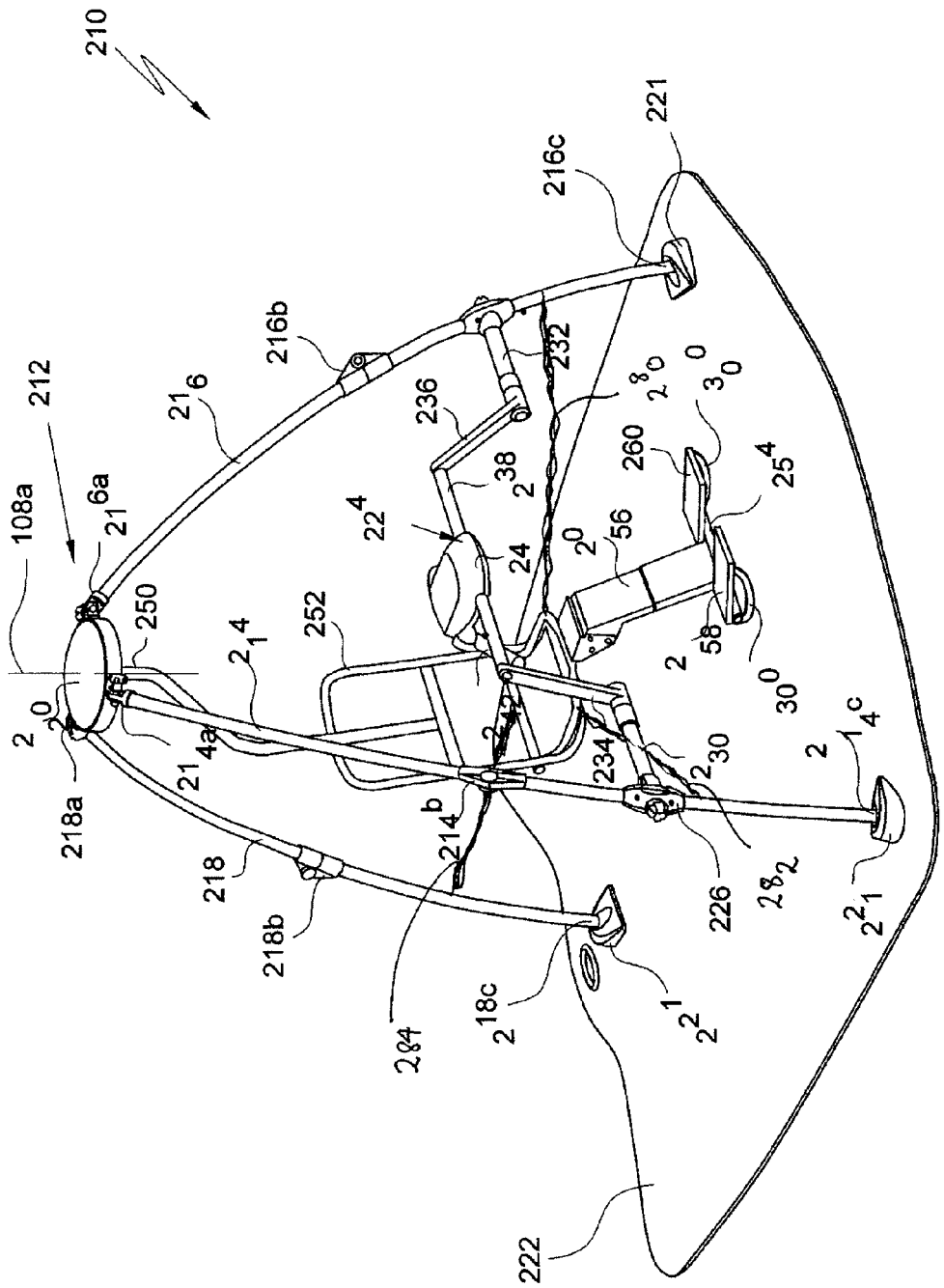
FIG. 7 is a perspective view of a second computer game controller.
Figure 8:
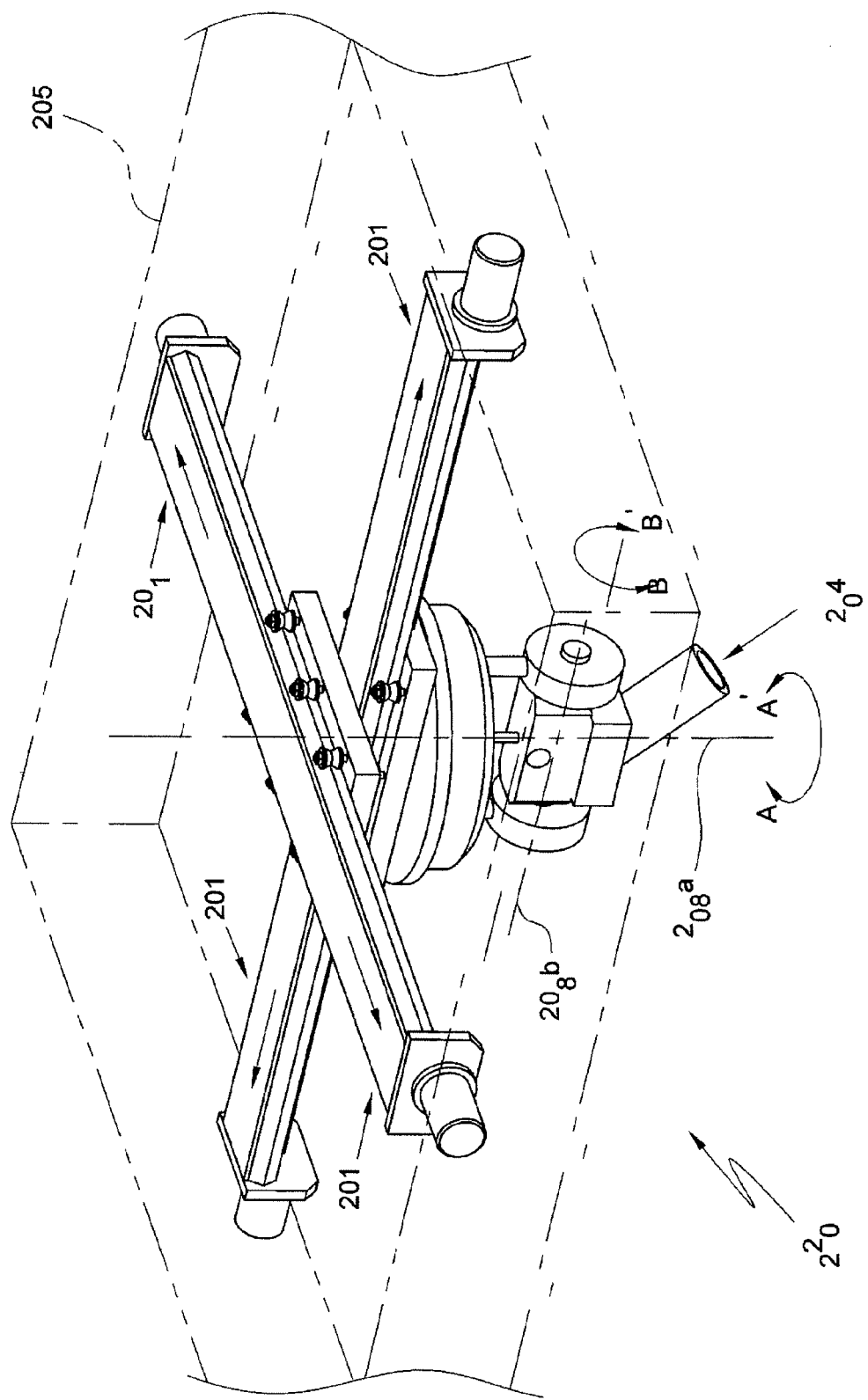
FIG. 8 is a perspective view of a bearing of the controller of FIG. 7
Figure 9:
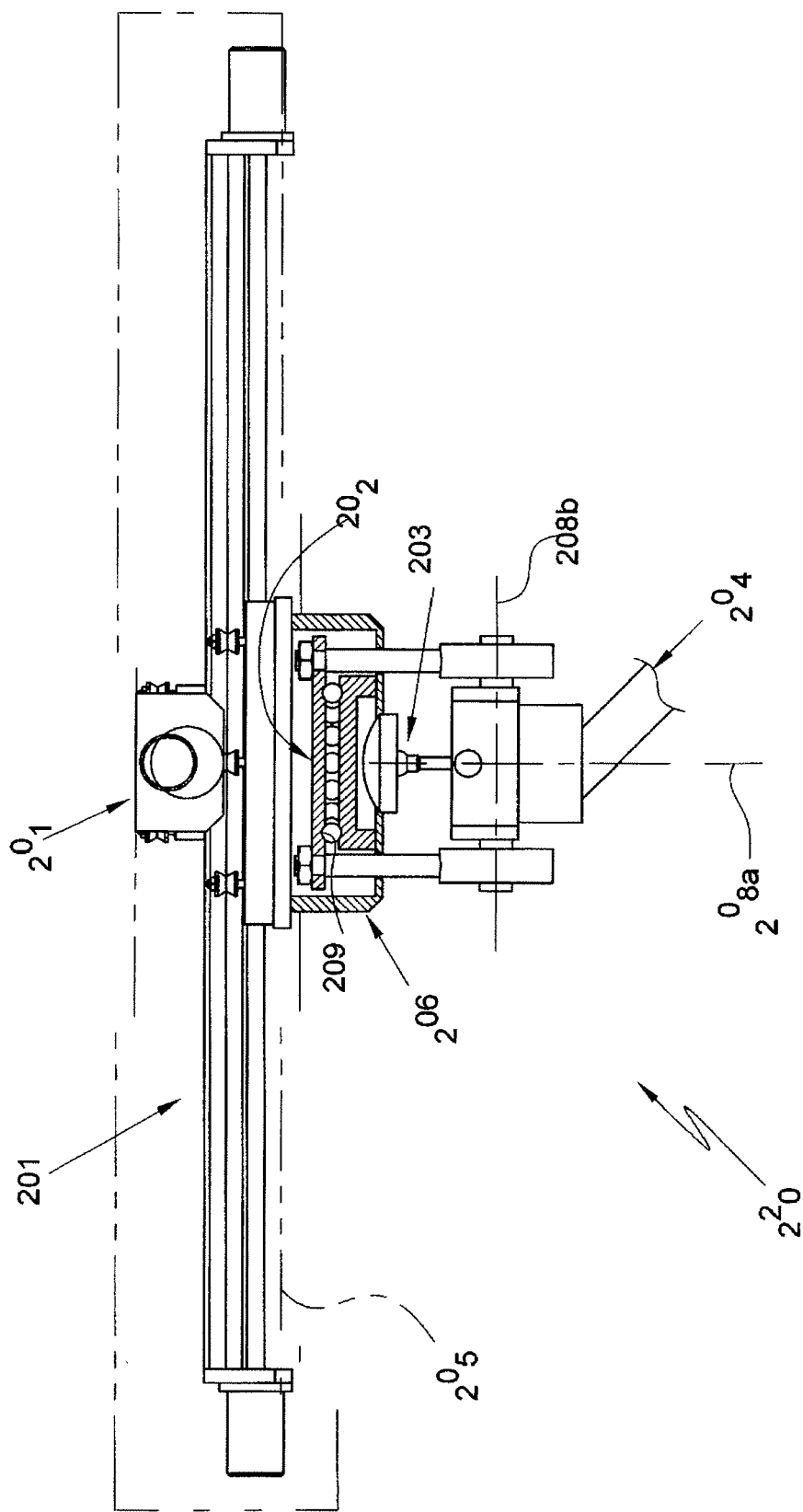
FIG. 9 is a perspective view of the control/bearing of FIG. 7.

FIGS. 7 to 9 illustrate improvements to the control means such as is described in PCT/AU2003/000754. As in the earlier application, the improved game controller 210 includes a frame in the form of a tripod 212 having two front legs 214, 216 and one rear leg 218. The top of each leg is connected to a top or head 220 of the tripod about respective pivots 214a, 216a and 218a as shown in more detail in FIG. 12. The legs themselves, are gently curved and are hinged about their respective mid points 214b, 216b, 218b so that they can be folded in two. The feet 214c, 216c, 218c of each leg locates in and is locked in a cylindrical hole in a plastic moulding 221 fixed to a mat 222 on which the tripod sits.

A handlebar assembly 224 extends between the front two legs of the tripod. The handlebar assembly 224 is mounted to the front legs 214, 216 by means of plastic fittings 226 which can be slid up or down the legs so that the height of the handlebar assembly is adjustable.

As shown in FIG. 7, the handlebar assembly 224 includes two co-axial stub portions 230, 232 linked by two radial arm portions 234, 236 to a central bar 238 extending parallel to the stub portions. The radial arm portions 234, 236 pivot about the stub portions to enable adjustment of the position of the central bar 238 relative to the stub portions. A control console 240 including handle grips 242, 243 (not shown) is attached to the central bar 238.

A T bar 250 depends down from the head of the tripod. The T-bar 250 is suspended from the head of the tripod by a 220 bearing such that it can be swung backwards and forwards and side to side or rotated about a vertical axis 108a. The head 220 is shown in FIGS. 8 and 9 and is essentially the same as the bearing and control means shown in FIGS. 5 and 6 but inverted. The bearing means 202 rotate on a tracked race 206 and the support means 204 can rotate about axis 208b in directions B and B' and about a vertical axis in directions A and A'. At the centre of the head 220 is a joystick control means 203 (providing pan and tilt movements). Locking means, 270, 272 (see FIG. 13) are provided to lock the control means in position for either back and forwards or side to side movement, or rotation. The addition of the servo assisted control means 201 allows the controller to be used in arcades and in other applications where assistance for player movement is required. This may include some physiotherapy applications.

As shown in FIG. 7, a chair 252 is removably attached to the T-bar 250. The chair includes a foot rest 254 in the form of a bar which is mounted to the chair by a length adjustable member 256 which is pivoted to the chair 252. Foot pedals 258, 260 are removably attached to the foot rest 254. Elastomeric straps 280, 282 and 284 extend between the seat and the frame to increase resistance to movement of the seat.

In the configuration for use in simulating driving a car shown in FIG. 7, vertical rotation about the bearing about axis A is permitted and side to side and backward and forward movement is locked off. The player grasps the handle grips which are angled down to simulate a steering wheel and turns the vehicle by pushing on the handlebars and twisting their body. The pedals 58, 60 typically control acceleration and braking as in a normal car. As described in PCT/AU2003/000754 resistance may be provided to movement about the top bearing 220.

However, in a further improvement, resistance may also be provided to movement of the foot/leg and hand/arm operated controls. For example spring or servo-motor based biasing means 300 may be provided to depression of the pedals 258 and 260. Alternatively instead of handlebars, two hand operated levers may be provided (not shown) which may be reciprocated back and forth against a resistance. Such a feature may be provided in, say, a boxing game or rowing simulation. Note also that the action need not necessarily correspond to a similar movement by a sprite of the like in a computer game, although it is preferable that there is some relationship between the two.

Other additional control means may include fixed handle bars, rotating wheels, finger and/or wrist controlled mechanisms, such as buttons handles and levers, foot pedals which may be depressed or rotated (as is the case with bicycle pedals), paddles which slide back and forward and push/pull foot braces, requiring a pumping action from the legs, or a treadmill to simulate walking. Some or all of the additional control means will be associated with resistance means to exercise the player's hands, feet, legs or arms. The resistance means may be provided by any suitable means including, but not limited to, hydraulic or pneumatic cylinders, electronically, using servo-motors or other means, or using elastic or elastomeric means, springs, braking systems etc. Note that these features may apply to the embodiment of FIGS. 1 to 6 and 10 and 11, as well as that of FIGS. 7 to 9.

In this way, the game controllers of the present invention may be used in physiotherapy applications. Where particular muscle groups or limbs of patient may need to be exercised, the controller means may be set up to provide that exercise as part of a computer game. Physiotherapy typically involves repetitive movement of particular limbs, muscle groups etc., which can be extremely tedious for the patient. Incorporating the exercise required into a computer game where repetitive movements are required for playing a game reduces patient boredom by immersing the patient in a whole of body gaming experience. Playing standard computer games using standard controllers such as joy pads or steering wheels involves a player making repetitive movements but because they are involved in playing a game, the repetition of these movements is not "boring". In the present invention the player's/patient's immersion in the game is increased by involving whole body control, reducing the likelihood of boredom still further.

Although many different set-ups are possible for the game controller of the present invention for physiotherapy functions, examples where the player is suspended include games where a pushbike, or at least a frame configured to simulate a pushbike, from the support means/controller and, inter alia, providing resistance to turning of the pedals to determine a player's speed in a game, with a patient's leaning or rotation controlling direction, or for patients without use of their legs suspending them from the support means/controller either in a wheel chair or on a seat, and allowing them to brace with their hands/arms and twist their body to control a computer game. A similar arrangement could of course be provided with the support means/controller below the patient although, resistance to turning movement would be expected to be much greater in that arrangement. Resistance for physiotherapy reasons can be provided to extension of a patient's legs as the basis for a rowing simulation, or for skiing or walking. It will also be appreciated that whatever physiotherapy is provided it is not necessary for the game/simulation being provided to correspond to the exercise. Although it is possible for the machine to be set up to provide a simulation of the exercise e.g. cycling or rowing being carried out it is equally possible to exercise while piloting a simulation of a space ship whilst still exercising. The person skilled in the art will appreciate that either controller may be used to provide a wide range of different exercise and physiotherapy applications.

Figure 10:
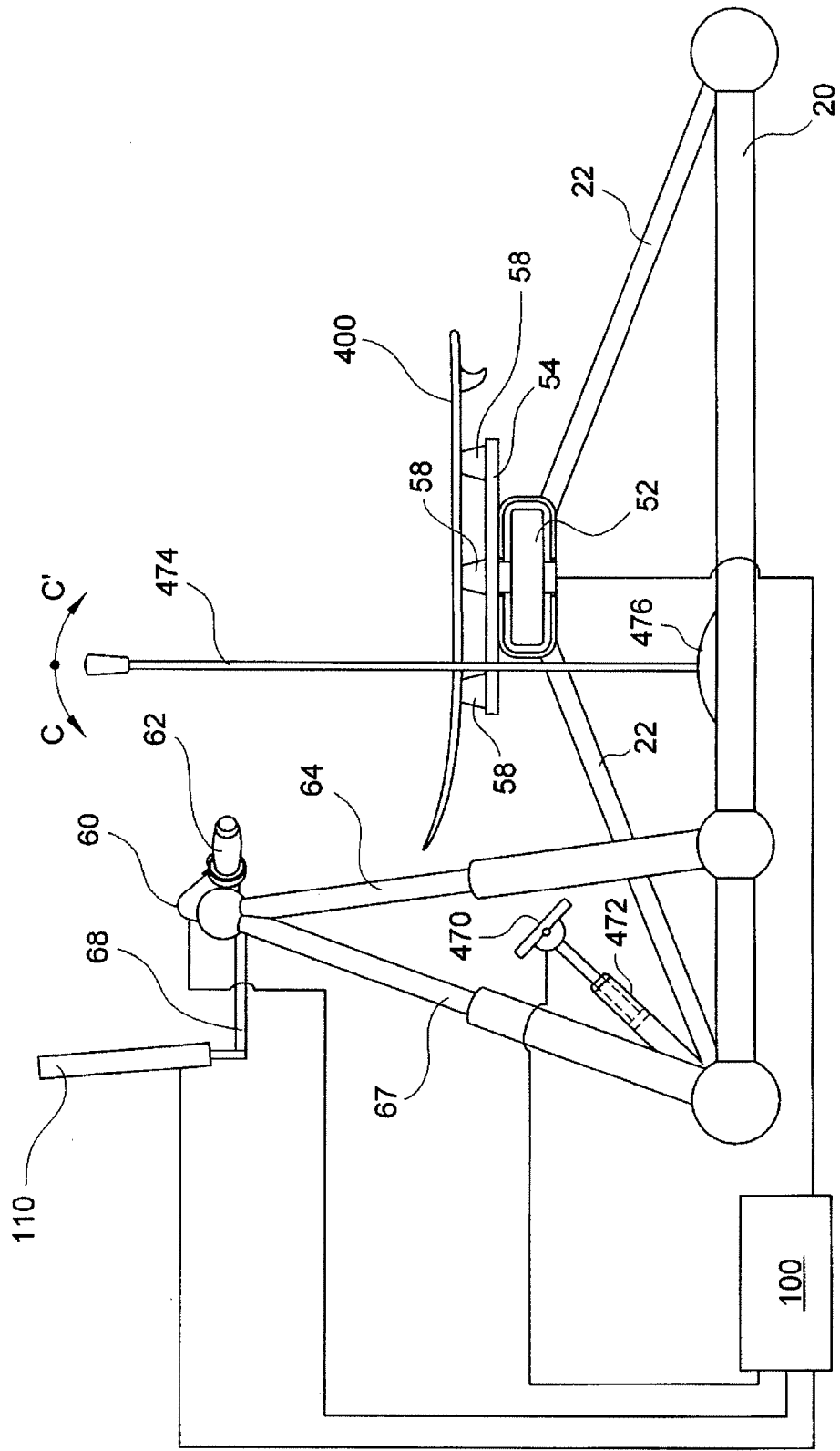
FIG. 10 is a schematic side view of the controller of FIG. 4 illustrating additional features including the mounting of a surfboard on a support means and foot pedals and hand operated levers.

FIG. 10 illustrates an embodiment of the present invention where the seat 56 has been removed and a surfboard 400 secured to the support plate. Clearly skateboards or other devices which may be ridden, may be used in place of the surfboard 400. The hand operated controls may not be used in such an application but if they are required the telescopic legs 64 to 67 may be used to raise the control panel 60 so that it is accessible. In this version it is possible to provide a harness suspended from above the player to catch the player if they fall of the board 400.

FIG. 10 also illustrates an unrelated variant to the invention in which the pedals 470 are mounted on hydraulic cylinders 472 (although other resistance providing means could be used) to provide resistance to depression of the pedals which might be used in a rowing game or simulation. Hand operated levers 474 which may rotate back and forth in the direction C and C' may also be provided and include a biasing means 476 to provide resistance to movement of the levers.

Figure 11:
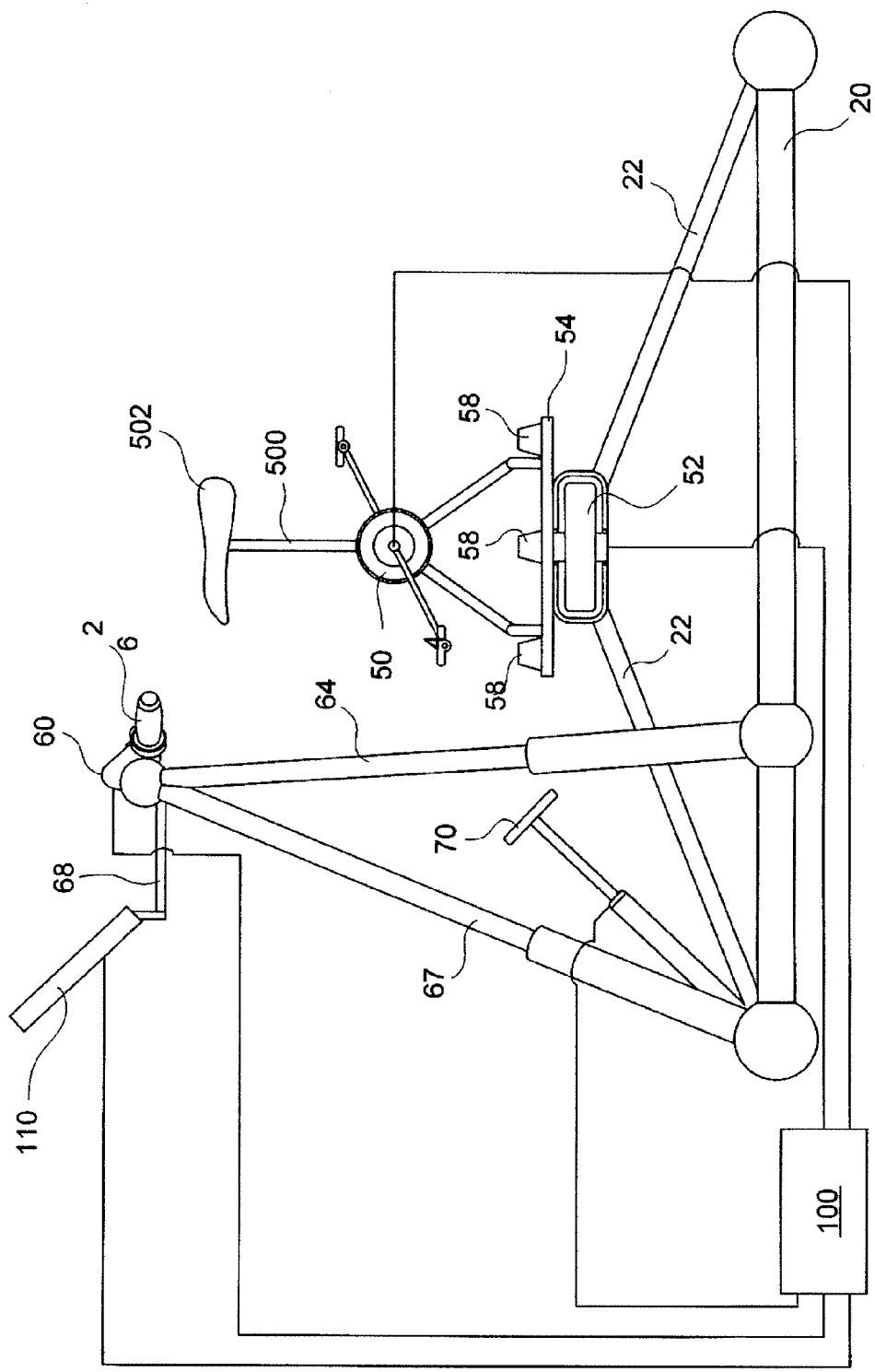
FIG. 11 is a schematic side view of the controller of FIG. 4 illustrating a cycling simulation.

FIG. 11 illustrates a below player game controller set up for a cycling simulation where a strut 500 and seat 502 is mounted to the support plate and a crank and pedals assembly 504 are provided including resistance means to provided resistance to turning of the cranks. A signal from the crank and pedals assembly corresponding to the speed of rotation of the assembly 504 is input to the console 100. As shown the struts 64 to 67 are extended to raise the control panel and handlebars 62. It will be appreciated that it is also possible to configure the above player controller of FIGS. 7 to 9 to simulate cycling.

Figure 12:
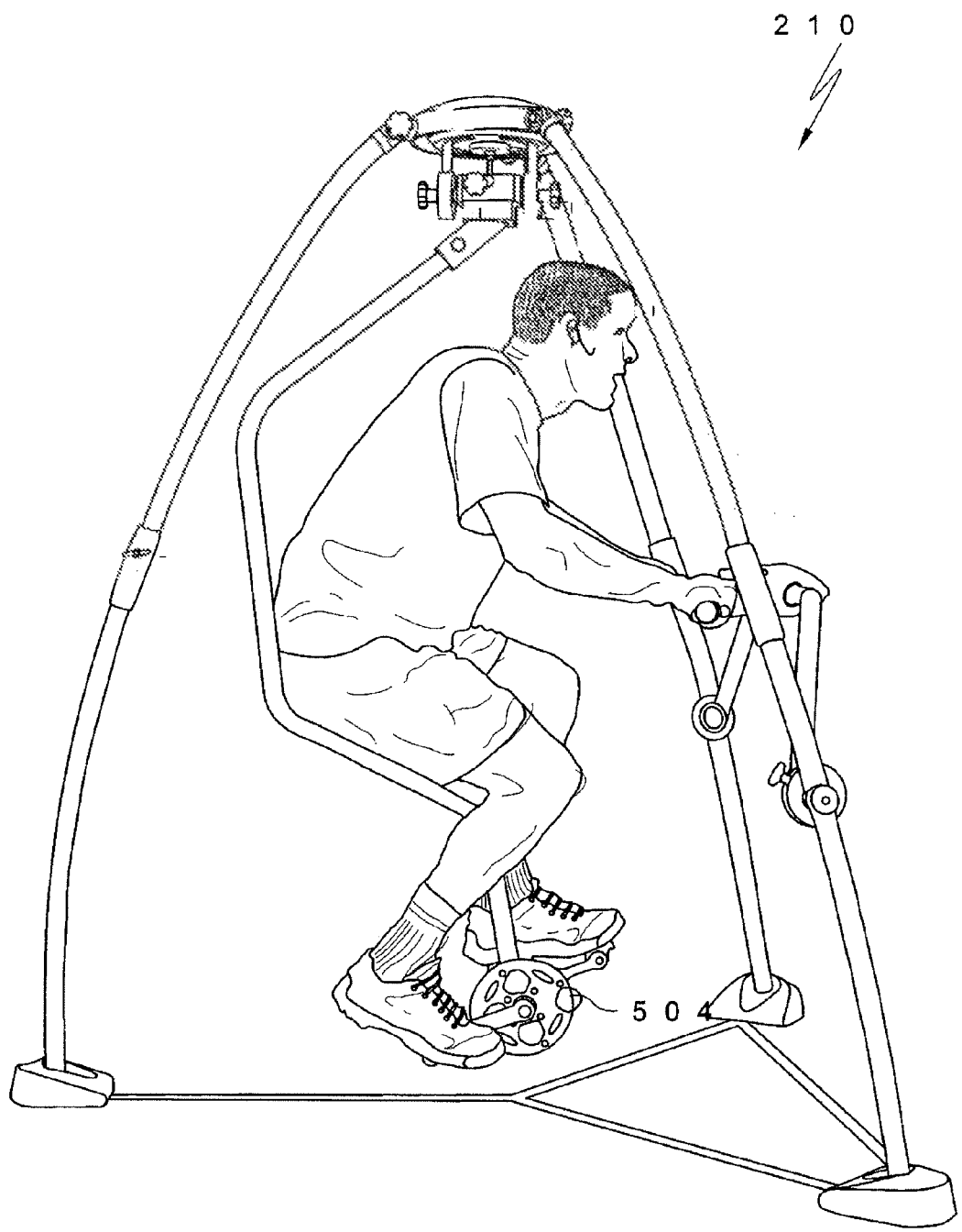
FIG. 12 illustrates the game controller of FIG. 7 configured to simulate riding a pushbike.

FIG. 12 illustrates the use of an above player game controller of the type shown in FIG. 7 set up to play a cycling game or simulation.

Figure 13:
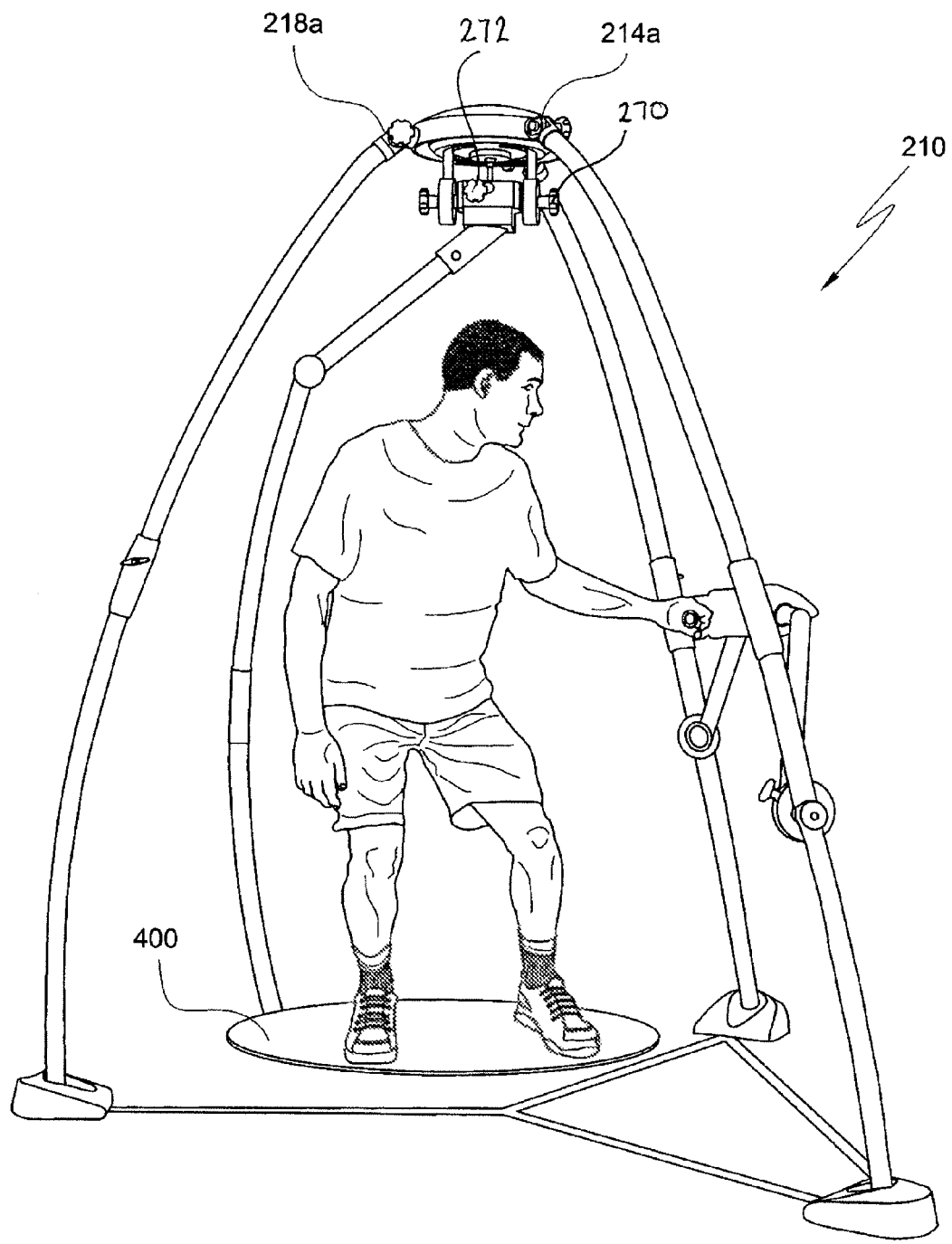
FIG. 13 illustrates the game controller of FIG. 7 configured to simulate boarding.

FIG. 13 illustrates use of an above player game controller of the type shown in FIG. 7 set up to play a boarding game or simulation, such as skate boarding or surfing.

Figure 14:
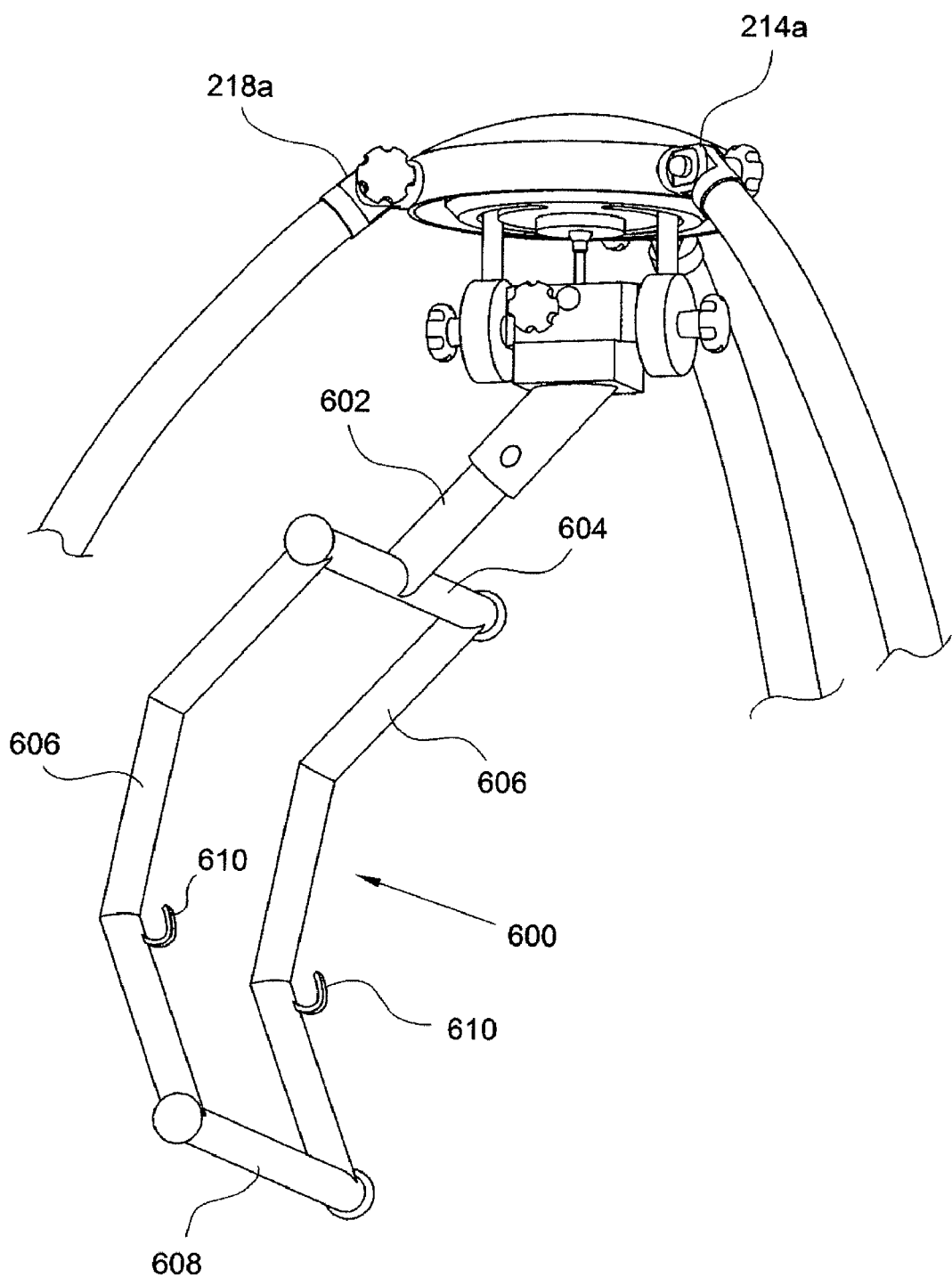
FIG. 14 shows a variant of the game controller of FIG. 7.

FIG. 14 shows a yet further variant of the controller of FIG. 7 in which the depending T-bar is replaced by a depending box frame 600. The depending box frame includes a short depending tube 602, a cross piece 604 from ends of which depend two parallel legs 606. Each leg 606 is cranked/bent twice into a generally concave shape. A cross piece 608 extends across the bottom of each leg. Each leg defines a hook 610 for hanging a chair (not shown in FIG. 14) thereon.

Game controllers embodying the present invention, whether the support and control means is located above or below the player, may be used to control a wide variety of games including driving, riding, "point of view" games, general children's character games and sports games.

Other variants and improvements, not shown may include the use of pneumatically operated airbags to effect braking and acceleration.

Driving games may include, but are not limited to, driving cars, planes, trains, automobiles, motorbikes, war vehicles, space craft, helicopters and any automobile or vehicle.

Riding games may include, but are not limited to, riding motorbikes, jet skis, pushbikes, skateboards, quad bikes, snowboarding, surfing and the like.

Point of view games may include, but are not limited to, combat games, "shoot 'em up games", such as "HALO", "SPLINTERCELL", "STAR WARS", "JEDI KNIGHTS" and the like.

General children's character games may include, but are not limited to, games such as "DONKEY KONG", "POKEMON", "CRASH BANDICOOT", 3 dimensional games and others.

Sports games may, by way of example, include, but are not limited to, tennis, soccer, Olympic games, wrestling, football, golf, baseball and cricket.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A controller means for controlling a computer game, the controller means comprising:
    a support means, or seat on which a player may sit, stand or be supported; the support means being disposed on a bearing means incorporating or associated with a control means;
    handlebars or other means which may be grasped by the player and/or foot pedals against which the player may brace their feet, in use; and
    a resistance means for increasing the resistance to movement of the support means relative to the bearing means, thereby providing physiotherapy exercise for the player;
    wherein the arrangement is such that in use, the player may brace themselves using the handlebars and/or pedals and move the support means on the bearing means to input control signals to the control means, wherein the support means and control means may rotate, and tilt sideways, backwards and forwards, and wherein the controller may also slide backwards and forwards and side to side and including means for lifting and dropping the support means on the order of a few centimeters for gravity effects.

2. A controller means for controlling a computer game as claimed in claim 1 arranged to operate in a similar manner to a joystick in which movement of the game player provides the normal forwards and backwards and side to side control functions of the joystick.

3. A controller means for controlling a computer game as claimed in claim 1 wherein the support means includes, or has mounted upon it, a chair, saddle, cradle or other seat means.

4. A controller means for controlling a computer game as claimed in claim 1 wherein the support means defines a plate on which a player may mount or fix their own surfboard, skateboard or the like to play a game.

5. A controller means for controlling a computer game as claimed in claim 4 wherein the support means defines rubber pads, or is coated with an elastomer or other non-slip coating or material.

6. A controller means for controlling a computer game as claimed in claim 4 wherein the support means is padded.

7. A controller means for controlling a computer game as claimed in claim 1 wherein sliding and or lifting is assisted by the controller means.

8. A controller means for controlling a computer game as claimed in claim 7 wherein the assistance is provided electronically by controlled servo-motors.

9. A controller means for controlling a computer game as claimed in claim 1 wherein additional control means which may be operated by the player's hands, feet, legs, fingers or arms are provided.

10. A controller means for controlling a computer game as claimed in claim 9 wherein the additional control means are selected from the group comprising fixed handle bars, rotating wheels, finger and/or wrist controlled mechanisms, including buttons handles and levers, foot pedals which may be depressed or rotated, paddles which slide back and forward and push/pull foot braces, requiring a pumping action from the legs, or a treadmill to simulate walking.

11. A controller means for controlling a computer game as claimed in claim 10 wherein one or more of the additional control means are also associated with resistance means to exercise the players hands, feet, legs or arms.

12. A controller means for controlling a computer game as claimed in claim 11 wherein the resistance means includes hydraulic or pneumatic cylinders, electronically operated means, servo-motors, elastic or elastomeric means, springs, or braking systems.

13. A controller means for a computer gaming machine comprising
 a support platform, such as a seat, platform, chair harness or the like, on which a player may sit, stand, lie, be suspended via a bearing means incorporating a control means, and
 a resistance means for increasing the resistance to movement of the support platform relative to the bearing means, thereby providing physiotherapy exercise for the player;
 wherein additional control means are provided for operation by one or more of the player's limbs including legs, feet, arms, hands, or fingers, and wherein resistance to movement of one or more of the additional control means is provided, thereby providing physiotherapy type exercise for the player, and wherein the resistance to movement includes hydraulic or pneumatic cylinders, electronically operated means, servo-motors, elastic or elastomeric means, springs, or braking systems.

14. A controller means for a computer gaming machine as claimed in claim 13 wherein a frame configured to simulate a pushbike, is suspended from the support means/controller and resistance is provided to turning of the pedals to determine a player's speed in a game, with a patient's leaning and/or rotation controlling direction.

15. A controller means for a computer gaming machine as claimed in claim 13 suitable for patients without use of their legs including means for suspending the patient from the support means/controller either in a wheel chair or on a seat, and allowing the patient to brace with their hands/arms and twist their body to control a computer game.

16. A computer game controller comprising means for suspending a player, in a support means such as a chair, or harness, from a bearing means, the bearing means including a control means for inputting position signals to a computer to control the movement of a sprite such as a vehicle or character, in a computer game, the bearing allowing side to side, forwards and backwards, and rotational movement of the player about the bearing and including selectively operable locking means for preventing either rotational movement or side to side and forwards and backwards movement, the arrangement being such that movement of the player's body may move the chair or harness to control the sprite in the computer game, the controller, further including resistance means for increasing the resistance to movement of the support means relative to the bearing, thereby providing physiotherapy exercise for the player, wherein the resistance means comprise an elastomeric strap extending between the frame and the support means.

17. A computer game controller as claimed in claim 16 wherein the means for suspending a player comprises a frame and wherein a handlebar means which can be grasped by the player in use is attached to the frame.

18. A computer game controller as claimed in claim 16 wherein the control means is of the joy stick type or of a rotational control wheel type.

19. A computer game system for playing a computer game comprising a computer console, a display means for displaying a game being played on the computer game system, and a game controller as claimed in claim 16 wherein movement of the body of a player suspended from the game controller is arranged to cause movement of a sprite in the game being played.

* * * * *